US009250733B2

(12) United States Patent
Lee et al.

(10) Patent No.: US 9,250,733 B2
(45) Date of Patent: Feb. 2, 2016

(54) HINGE DEVICE AND FOLDABLE DISPLAY APPARATUS HAVING THE SAME

(71) Applicant: Samsung Electronics Co., Ltd., Suwon-si, Gyeonggi-do (KR)

(72) Inventors: Sang-chul Lee, Namyangju-si (KR); Sang-il Park, Seoul (KR); Sang-wol Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/461,560

(22) Filed: Aug. 18, 2014

(65) Prior Publication Data

US 2015/0233162 A1     Aug. 20, 2015

(30) Foreign Application Priority Data

Feb. 17, 2014    (KR) .......................... 10-2014-0017606

(51) Int. Cl.
E05D 3/06       (2006.01)
G06F 3/041      (2006.01)
H04M 1/02       (2006.01)

(52) U.S. Cl.
CPC ................ *G06F 3/041* (2013.01); *H04M 1/02* (2013.01); *E05Y 2900/606* (2013.01)

(58) Field of Classification Search
CPC .............. E05D 3/04; E05D 3/06; E05D 3/14; E05D 3/122

USPC ............................................ 16/366, 369, 370
See application file for complete search history.

(56) References Cited

U.S. PATENT DOCUMENTS

| 3,092,870 | A | * | 6/1963 | Baer ............................... 16/277 |
| 4,961,126 | A | * | 10/1990 | Suzuki ..................... 361/679.09 |
| 8,727,601 | B2 | * | 5/2014 | Wang et al. .................... 362/632 |
| 8,804,324 | B2 | * | 8/2014 | Bohn et al. ............... 361/679.27 |
| 8,804,349 | B2 | * | 8/2014 | Lee et al. ........................ 361/749 |
| 2003/0177607 | A1 | * | 9/2003 | Pelletier ........................... 16/354 |
| 2012/0044620 | A1 | * | 2/2012 | Song et al. ............... 361/679.01 |
| 2012/0314399 | A1 | * | 12/2012 | Bohn et al. .................... 362/97.1 |
| 2013/0016460 | A1 | * | 1/2013 | Yeh et al. ................. 361/679.01 |

* cited by examiner

*Primary Examiner* — Roberta Delisle
(74) *Attorney, Agent, or Firm* — Jefferson IP Law, LLP

(57) ABSTRACT

A foldable display apparatus is provided. The foldable display apparatus includes a flexible display panel, first body configured to support a left portion of a flexible display panel, and second body configured to support a right portion of the flexible display panel, first and second frames configured to surround portions of outlines of the first and second bodies, a hinge member configured to hinge-connect the first and second frames with each other in a foldable manner, and first and second supports having sides hinge-connected to the first and second frames, and configured to form an accommodation space in which a folded portion of the flexible display panel is folded to form a curvature at a first position at which the first and second bodies are folded, and to support the folded portion of the flexible display panel at a second position at which the first and second bodies are unfolded.

19 Claims, 16 Drawing Sheets

HINGE DEVICE AND FOLDABLE DISPLAY APPARATUS HAVING THE SAME

CROSS-REFERENCE TO RELATED APPLICATION(S)

This application claims the benefit under 35 U.S.C. §119 (a) of a Korean patent application filed on Feb. 17, 2014 in the Korean Intellectual Property Office and assigned Serial number 10-2014-0017606, the entire disclosure of which is hereby incorporated by reference.

TECHNICAL FIELD

The present disclosure relates to a hinge device and a foldable display apparatus having the same. More particularly, the present disclosure relates to a hinge device on which a flexible display panel is arranged in a foldable manner, and a foldable display apparatus having the same.

BACKGROUND

In general, a flexible display panel is a display panel that can be bent with a predetermined curvature. According to the related art, display panels, which are not configured to be flexible display panels, generally use a glass substrate. In contrast, a flexible display panel uses a plastic substrate rather than a glass substrate. As a result, in order to prevent damage to the substrate, a low-temperature manufacturing process is mainly used without using the existing manufacturing process.

Such a flexible display panel according to the related art has been produced as a touch screen on which, for example, a capacitive or resistive touch input can be made to receive a user's command in a touch type.

A portable foldable display apparatus in the related art is provided with a flexible display panel on which a touch input can be made as described above. In such a foldable display apparatus in the related art, a specific accommodation space, in which a folded portion of the flexible display panel can be bent with a specific curvature, is formed in a portion at which a pair of bodies that support the flexible display panel are hinge-connected with each other.

According to the foldable display apparatus in the related art, however, if the pair of bodies are unfolded to form a straight angle so that a user can view an image that is displayed on the flexible display panel, a center portion (e.g., folded portion) of the flexible display panel is positioned on an upper side of the accommodation space, and the rear surface of the flexible display panel becomes in an unsupported state.

Accordingly, if a user touches the center portion of the flexible display panel, the flexible display panel is pushed to move a specific distance in a touch direction. Consequently, inputting an accurate touch input on the center portion of the flexible display panel is difficult, thereby deteriorating the usability of the flexible display panel according to the related art.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a hinge device and a foldable display apparatus having the same, which can entirely support a flexible display panel when the foldable display apparatus is unfolded and thus can stably support the flexible display panel in a state in which the flexible display panel is not pushed by a user's touch operation.

Another aspect of the present disclosure is to provide a hinge device and a foldable display apparatus having the same, which can protect an outer side of the foldable display apparatus as well as improve the sense of beauty of the external appearance of the foldable display apparatus through a cover provided to surround the outer side of the foldable display apparatus, and can prevent user's skin or nail from being caught in a folded portion during folding of the foldable display apparatus.

In accordance with an aspect of the present disclosure, a hinge device is provided. The hinge device includes a first body configured to support a left portion of a flexible display panel, a second bodies configured to support left and a right portion of the flexible display panel, a hinge member configured to hinge-connect the first body and the second body with each other in a foldable manner, first support and a second support, wherein the first support and the second support respectively include sides respectively arranged on the first body and the second body to swing and configured to form an accommodation space in which a folded portion of the flexible display panel is folded to form a curvature at a first position at which the first body and the second body are folded and to support the folded portion of the flexible display panel at a second position at which the first body and the second body are unfolded.

In accordance with another aspect of the present disclosure, the hinge member may have a groove formed thereon, into which respective free end portions of the first support and the second support are inserted at the first position.

In accordance with another aspect of the present disclosure, the respective free end portions of the first support and the second support may be supported at upper ends of both side walls of the groove.

In accordance with another aspect of the present disclosure, the first body and the second body may have inclined surfaces formed on an inside of a portion at which the first support and the second support overlap each other.

In accordance with another aspect of the present disclosure, the first body and the second body and the first support and the second support may be arranged on a same plane at the second position.

In accordance with another aspect of the present disclosure, the first support and the second support may be movably arranged on the first body and the second body.

In accordance with another aspect of the present disclosure, the flexible display panel may have a non-attachment section that is not attached to the first support and the second support.

In accordance with another aspect of the present disclosure, a non-attachment section of the flexible display panel that is not attached to the first support and the second support may correspond to the folded portion that forms the curvature of the flexible display panel when the first body and the second body are folded.

In accordance with another aspect of the present disclosure, free end portions of the first support and the second support may be pulled toward the hinge member and may come in contact with the hinge member.

In accordance with another aspect of the present disclosure, an attractive force that is caused by a magnetic force may act between the first support and the second support and the hinge member.

In accordance with another aspect of the present disclosure, a first elastic member may be arranged between the first support and the first body, and a second elastic member may be arranged between the second support and the second body.

In accordance with another aspect of the present disclosure, the first elastic member may be a tensile spring having one end connected to the first support and the other end connected to the first body, and the second elastic member may be a tensile spring having one end connected to the second support and the other end connected to the second body.

In accordance with another aspect of the present disclosure, the first elastic member and the second elastic member may be composed of torsion springs.

In accordance with another aspect of the present disclosure, the first body and the second body may simultaneously swing at the same angle against the hinge member.

In accordance with another aspect of the present disclosure, a foldable display apparatus is provided. The foldable display apparatus includes a flexible display panel, a first body portion and a second body portion configured to support a rear surface of the flexible display panel, a hinge member configured to connect the first body portion and the second body portion with each other in a foldable manner, and a first support and a second support configured to be arranged to overlap the first and second body portions in a separable manner, wherein the first support and the second support form an accommodation space in which a folded portion of the flexible display panel is bent to have a curvature of the flexible display panel when the first body portion and the second body portion are folded, and support the rear surface of the flexible display panel when the first body portion and the second body portion make a straight angle.

In accordance with another aspect of the present disclosure, a foldable display apparatus is provided. The foldable display apparatus includes a flexible display panel, and a hinge unit configured to provide a biasing force on the flexible display panel if the flexible display panel is positioned in a flat configuration such that the biasing force biases the flexible display panel to remain in the flat configuration.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
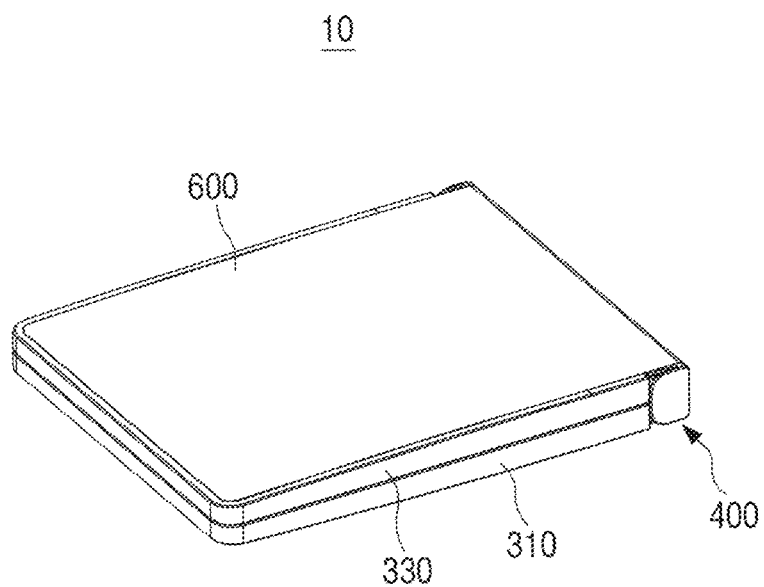
FIG. 1 is a perspective view illustrating a foldable display apparatus in a folded state according to an embodiment of the present disclosure.
Figure 2:
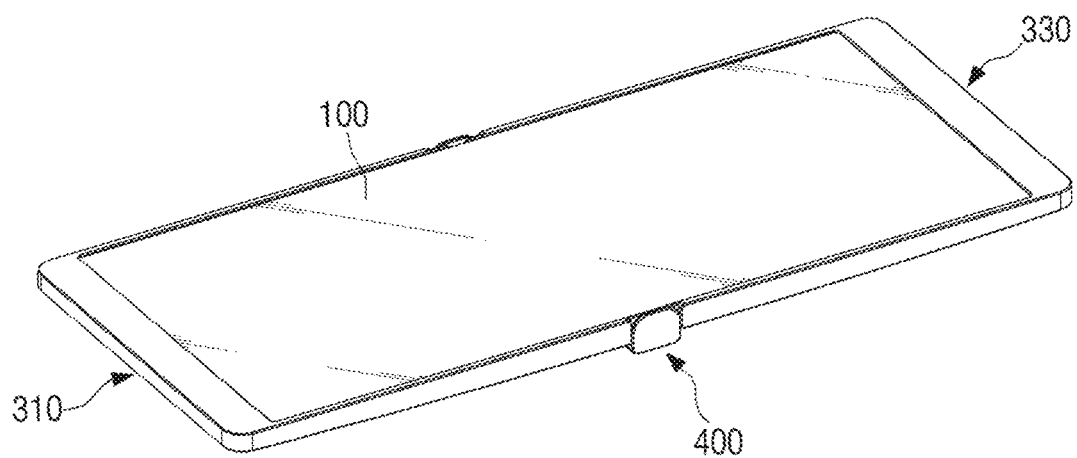
FIG. 2 is a perspective view illustrating a foldable display apparatus in an unfolded state at a straight angle according to an embodiment of the present disclosure.
Figure 3:
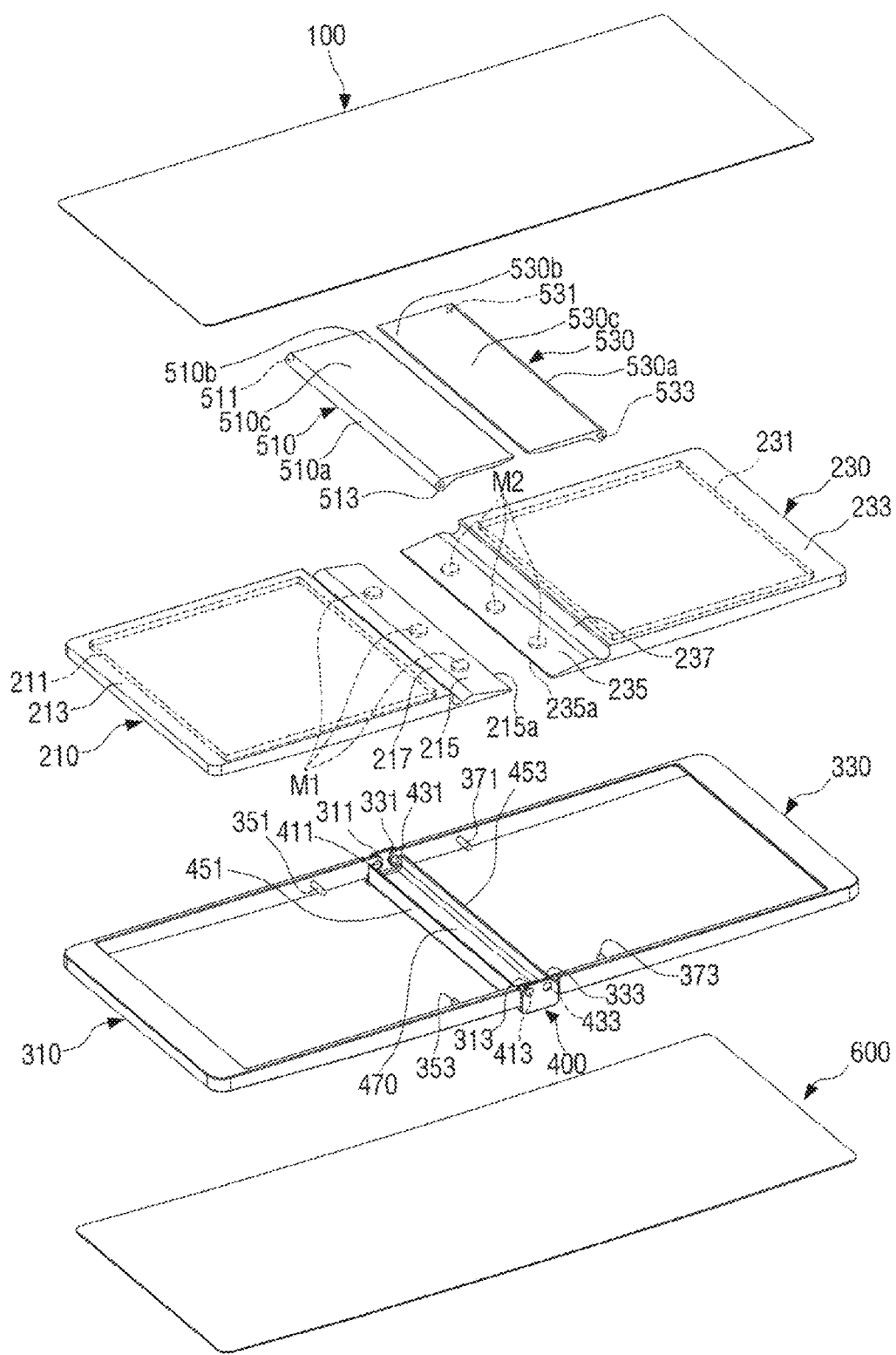
FIG. 3 is an exploded perspective view illustrating a foldable display apparatus according to an embodiment of the present disclosure.

FIG. 1 is a perspective view illustrating a foldable display apparatus in a folded state according to an embodiment of the present disclosure. FIG. 2 is a perspective view illustrating a foldable display apparatus in an unfolded state at a straight angle according to an embodiment of the present disclosure. FIG. 3 is an exploded perspective view illustrating a foldable display apparatus according to an embodiment of the present disclosure.

Referring to FIGS. 1, 2, and 3, a foldable display apparatus 10 according to an embodiment of the present disclosure includes a flexible display panel 100, first body 210, second body 230, first frame 310, second frame 330, a hinge member 400, first support 510, second support 530, and a cover 600.

The flexible display panel 100 may be produced as a touch screen on which a capacitive touch input, a resistive touch input, and/or the like can be made to receive a user's command in a touch type.

When the flexible display panel 100 is unfolded at a straight angle (180°), the aspect ratio (e.g., the ratio of the width to the height) thereof may become 2.37:1 that corresponds to the aspect ratio of a wide screen (e.g., the aspect ratio of a 35 mm film frame). The size of such a foldable display apparatus 10 may be set in a manner that the foldable display apparatus 10 in a folded state can be easily inserted into a user's pocket like a folded purse to improve the portability. Further, in addition to the above-described aspect ratio, the flexible display panel 100 may have the aspect ratio of 4:3 or 1.33:1 that is the aspect ratio of a traditional television screen or the aspect ratio of 16:9 that is the aspect ratio of a high-definition television screen.

According to the flexible display panel 100, as illustrated in FIG. 1, when the first body 210 and the second body 230 are folded toward each other, a folded portion 110 (see FIG. 8B) of the flexible display panel 100 is bent with a predetermined curvature to be folded.

Further, if the first body 210 and the second body 230 are unfolded to form a straight angle, the flexible display panel 100 becomes unfolded flat as illustrated in FIG. 2. At this time, the flexible display panel 100 is supported by the first body 210, the second body 230, the first support 510, and the second support 530.

As illustrated in FIG. 3, the first body 210 and the second body 230 have flat inner side surfaces that support the flexible display panel 100. The first accommodation space 211 and the second accommodation space 231 may be respectively formed in the first body 210 and the second body 230 to accommodate electronic components, such as a printed circuit board 20 (see FIG. 4) and a battery (not illustrated).

In this case, electrical contact between the electronic components (e.g., PCB 20) that are separately arranged in the first accommodation space 211 and the second accommodation space 231 may be made through a Flexible Printed Circuit Board (FPCB) 291.

Figure 4:
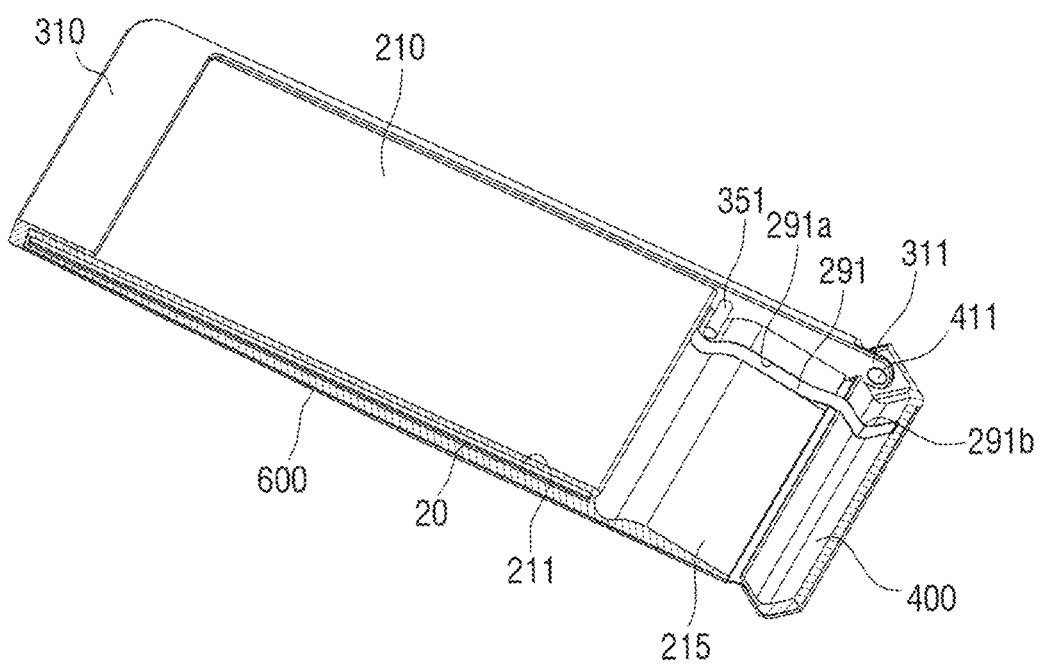
FIG. 4 is a partially cut perspective view explaining an example in which an Flexible Printed Circuit Board (FPCB) is used for electrical connection between electronic components arranged in an accommodation space of first and second bodies according to an embodiment of the present disclosure.

FIG. 4 is a partially cut perspective view explaining an example in which an FPCB is used for electrical connection between electronic components arranged in an accommodation space of first and second bodies according to an embodiment of the present disclosure.

Referring to FIG. 4, it is preferable that the FPCB 291 is arranged along an adjacent portion 215 of the first body 210 and an inside of the hinge member 400 to prevent the foldable display apparatus 10 from being exposed to an outside. In this case, it is preferable that insertion groove 291a and insertion groove 291b for inserting the FPCB 291 therein are formed on the adjacent portion 215 of the first body 210 and the hinge member 400. For convenience in explanation, FIG. 4 omits illustration of the flexible display panel 100 and the first support 510.

Surface 213 and surface 233 of the first body 210 and the second body 230 are attached and fixed to left and right portions of the rear surface of the flexible display panel 100. In this case, liquid or gel type adhesives may be spread or a both-side adhesive tap may be arranged between the first body 210 and the second body 230 and the flexible display panel 100.

If the foldable display apparatus 10 is not in use, the first body 210 and the second body 230 may be set to be at the first position (see FIG. 8A) in which the first body 210 and the second body 230 are folded toward each other. In contrast, if the foldable display apparatus 10 is in use, the first body 210 and the second body 230 may be set to be at the second position (see FIG. 10A) in which the first body 210 and the second body 230 are unfolded at a straight angle.

The first support 510 and the second support 530 are arranged in parallel to overlap the adjacent portion 215 and the adjacent portion 235 of the first body 210 and the second body 230. In this case, curved groove 217 and curved groove 237, into which curved projection portions 510a and 530a of the first support 510 and the second support 530 are slidably inserted, are formed on the first body 210 and the second body 230, respectively.

In this case, the adjacent portion 215 of the first body 210 and the adjacent portion 235 of the second body 230 are formed to be inclined so that the thickness thereof becomes thinner as going toward the ends 215a and 235a of the first body 210 and the second body 230. As the adjacent portion 215 and the adjacent portion 235 are formed to be inclined, the first support 510 and the second support 530 may come in close contact with the adjacent portion 215 and the adjacent portion 235 when the first body 210 and the second body 230 are set to the first position, and may swing at a predetermined angle to be spaced apart from the adjacent portion 215 and the adjacent portion 235 by a predetermined distance when the first body 210 and second body 230 are set to the second position.

As described above, because the first support 510 and the second support 530 can swing at the predetermined angle, a space portion S may be formed in which the folded portion 110 of the flexible display panel 100 can be naturally bent with a predetermined curvature at the first position. Through this, the foldable display apparatus 10 can prevent the folded portion 110 of the flexible display panel 100 from being damaged or can prevent the deterioration of durability.

A plurality of magnets M1 and M2 are built in the adjacent portions 215 and 235 of the first body 210 and the second body 230. In this case, due to an attractive force that acts between the plurality of magnets M1 and M2 and the first support 510 and the second support 530 that are made of a magnetic material, the first support 510 and the second support 530 are pulled toward the adjacent portion 215 and the adjacent portion 235 of the first body 210 and the second body 230. Accordingly, free end portion 510b of the first support 510 and free end portion 530b of the second support 530 are kept to come in contact with upper end of first wall 451 and second wall 453 of the hinge member 400 to be described later. Through this, the folded portion 110 of the flexible display panel 100 that is bent with the predetermined curvature at the first position can be prevented from being pressed by the first support 510 and the second support 530.

As described above, it can be implemented that the first support 510 and the second support 530 prevent the folded portion 110 of the flexible display panel 100 from being pressed using the plurality of magnets M1 and M2, but are not limited thereto.

For example, by magnetizing the whole or a part of the hinge member 400 (e.g., first wall 451 and second wall 453), the first support 510 and the second support 530 that are made of a magnetic material can be pulled toward the hinge member 400. In contrast, the whole or a part of the first support 510 and the second support 530 (e.g., the free end portion 510b and the free end portion 530b) may be magnetized, and the hinge member 400 may be made of a magnetic material.

Figure 5:
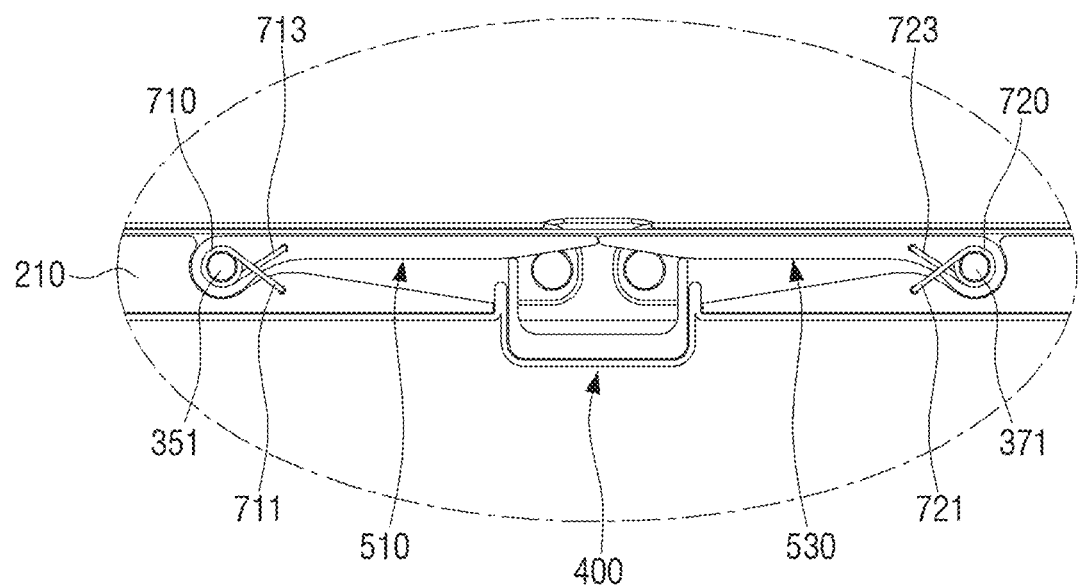
FIG. 5 is a schematic view explaining an example in which a torsion spring is installed in a hinge connection portion between first and second bodies and first and second supports according to an embodiment of the present disclosure.

FIG. 5 is a schematic view explaining an example in which a torsion spring is installed in a hinge connection portion between first and second bodies and first and second supports according to an embodiment of the present disclosure.

Referring to FIG. 5, as another example in which the first support 510 and the second support 530 are pulled toward the adjacent portion 215 and the adjacent portion 235 of the first body 210 and the second body 230, a torsion spring 710 may be installed in a third hinge portion 351. It is preferable that one end 711 of the torsion spring 710 is fixed to the first body 210 and the other end 713 thereof is fixed to the first support 510. In this case, although not illustrated in the drawing, the torsion spring 710 may also be installed in a fourth hinge portion 371. A torsion spring 720 may be installed between the second body 230 and the second support 530. It is preferable that one end 721 of the torsion spring 720 is fixed to the second body 230. According to various embodiments of the present disclosure, another end 723 of the torsion spring 720 may be fixed to the second support 530.

Figure 6:
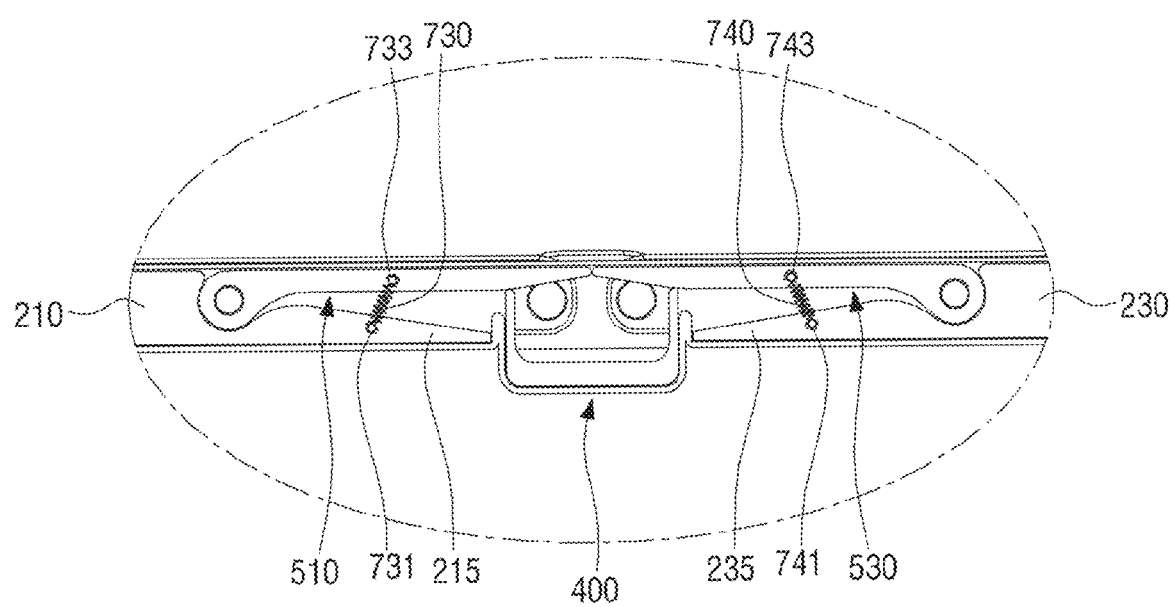
FIG. 6 is a schematic view explaining an example in which a tensile spring is installed in a hinge connection portion between first and second bodies and first and second supports according to an embodiment of the present disclosure.

FIG. 6 is a schematic view explaining an example in which a tensile spring is installed in a hinge connection portion between first and second bodies and first and second supports according to an embodiment of the present disclosure.

Referring to FIG. 6, as another example in which the first support 510 and the second support 530 are pulled toward the adjacent portion 215 of the first body 210 and the adjacent portion 235 of the second body 230, a tensile spring 730 may be installed between the first body 210 and the first support 510. It is preferable that one end 731 of the tensile spring 730 is fixed to the first body 210 and the other end 733 of the tensile spring 730 is fixed the first support 510. According to various embodiments of the present disclosure, a tensile spring 740 may also installed between the second body 230 and the second support 530. According to various embodiments of the present disclosure, one end 741 of the tensile spring 740 may be fixed to the second body 230, and the other end 743 of the tensile spring 740 may be fixed to the second support 530.

The first frame 310 and the second frame 330 are symmetrically formed, and are combined along outlines of the first body 210 and the second body 230. In this case, the first frame 310 and the second frame 330 surround three remaining sides of four sides of the outlines of the first body 210 and the second body 230 except for one adjacent portion.

Both end 311 and end 313 of the one side of the first frame 310 are hinge-connected to a pair of first hinge projections 411 and 413 that project from the insides of both ends of the hinge member 400. The second frame 330 is hinge-connected to a pair of second hinge projections 431 and 433 that project from the insides of both ends of the hinge member 400.

Accordingly, the first frame 310 and the second frame 330 are rotated around the pair of first hinge projections 411 and 413 and second hinge projections 431 and 433 together with the first body 210 and the second body 230 to be set to the first position or the second position.

Figure 7A:
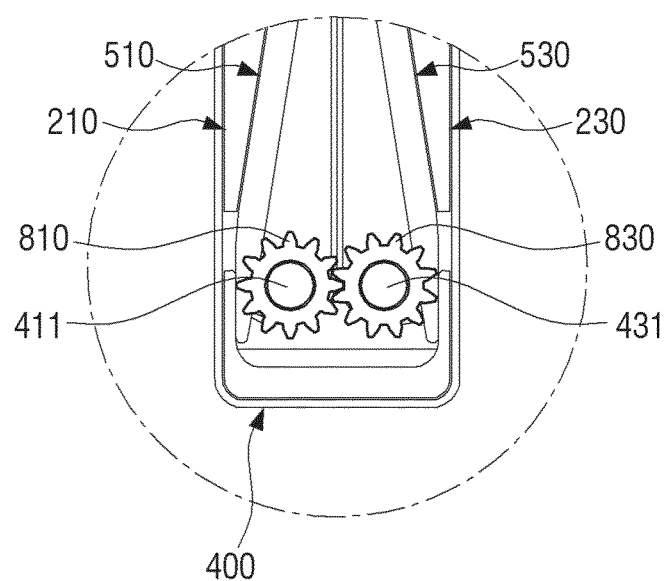
FIGS. 7A and 7B are schematic views illustrating first and second gears formed in first and second frames in a tooth-engaged state according to an embodiment of the present disclosure.
Figure 7B:
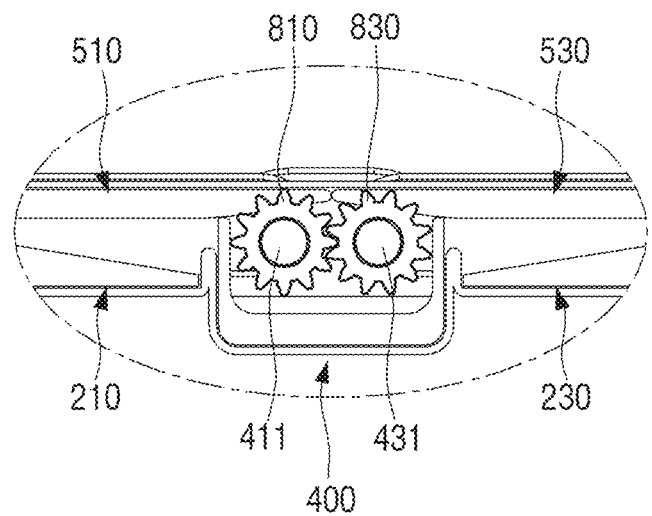

FIGS. 7A and 7B are schematic views illustrating first and second gears formed in first and second frames in a tooth-engaged state according to an embodiment of the present disclosure.

Referring to FIGS. 7A and 7B, the first frame 310 may be provided with a first gear 810 that is provided at any one of the both ends 311 and 313 of the first frame 310. The first gear 810 may be fixed to the first frame 310 and the first hinge projection 411 may rotatably penetrate the first frame 310.

Further, the second frame 330 may be provided with a second gear 830 that is provided at any one of the both ends 331 and 333 of the second frame 330. The second gear 830 may be fixed to the second frame 330 and the second hinge projection 431 may rotatably penetrate the second frame 330. Further, because the second gear 830 is tooth-engaged with the first gear 810, the first body 210 and the second body 230 can be folded toward each other to be accurately symmetrical with each other in a synchronized state.

A pair of third hinge projections 351 and 353 are formed on inner sides to face each other. The pair of third hinge projections 351 and 353 are inserted into hinge hole 511 and hinge hole 513 formed on both ends of the first support 510 so that the first support 510 can swing. A pair of fourth hinge projections 371 and 373 are formed on inner sides to face each other. The pair of fourth hinge projections 371 and 373 are inserted into hinge hole 531 and hinge hole 533 formed on both ends of the second support 530 so that the second support 530 can swing.

The hinge member 400 has first wall 451 and second wall 453 formed thereon to face each other along a length direction, and a groove 470 is provided by the first wall 451 and the second wall 453.

When the first wall 451 and the second wall 453 are switched from the first position to the second position, the first wall 451 and the second wall 453 serve to push the free end portion 510b of the first support 510 and the free end portion 530b of the second support 530 toward the flexible display panel 100.

In this case, it is preferable that heights of the first wall 451 and the second wall 453 are set in consideration of a point that the surface 510c of the first support 510 and the surface 530c of the second support 530 are arranged to be positioned on substantially the same plane as the plane of the surface 213 of the first body 210 and the surface 233 of the second body 230. As described above, if the surface 510c of the first support 510 and the surface 530c of the first support 530 are positioned on the same plane as the plane of the surface 510c of the first support 510 and the surface 530c of the second support 530 at the second position, the flexible display panel 100 can be unfolded flat.

The groove 470 provides a specific escape space into which the free end portion 510b of the first support 510 and the free end portion 530b of the second support 530 are inserted at the first position.

The first support 510 and the second support 520 support a center portion of the flexible display panel 100 at the second position. In this case, liquid or gel type adhesives (not illustrated) are spread or a dual-side adhesive tape (not illustrated) is arranged on the surface 510c of the first support 510 and the surface 530c of the second support 530, and thus the surface 510c of the first support 510 and the surface 530c of the second support 530 are attached and fixed to the rear surface of the flexible display panel 100 (substantially a part in the center of the flexible display panel 100).

Regions of the first support 510 and the second support 530 that substantially correspond to the free end portion 510*b* and the free end portion 530*b* are not attached to the flexible display panel 100 but are separated from the flexible display panel 100.

As described above, a non-attachment section of the flexible display panel 100 may correspond to the folded portion 110 that is bent with the predetermined curvature of the flexible display panel 100 at the first position. As described above, by providing the non-contact section in the flexible display panel 100, the folded portion 110 of the flexible display panel 100 is bent with the predetermined curvature to prevent the damage of the folded portion 110 at the first position.

The respective hinge holes 511 and 513 of the first support 510, and 531, and 533 of the second support 530 are formed to be somewhat larger than the diameter of the third and fourth hinges 351 and 353 of the first support 510, and 371 and 373 of the second support 530, and the first support 510 and the second support 530 may move a predetermined distance. As described above, the first support 510 and the second support 530 swing at a predetermined angle during switching between the first position and the second position, and thus the gaps formed between the respective hinge holes 511, 513, 531, and 533 and the third and fourth hinge projections 351, 353, 371, and 373 can prevent tensile fatigue from being concentrated onto a portion of the flexible display panel 100 that correspond to the boundary between the first body 210 and second body 230 and the first support 510 and the second support 530.

The cover 600 has a predetermined thin thickness, and is simultaneously attached to outer surfaces of the first body 210 and the second body 230 and an outer surface of the hinge member 400. Accordingly, the first body 210 and the second body 230 and the hinge member 400 can be firmly supported by the cover 600.

The cover 600 as described above can protect the outer portion of the foldable display apparatus 10 as well as improve the sense of beauty of the external appearance of the foldable display apparatus 10. The cover 600 may be made of a textile sheet or urethane resin.

Figure 11A:
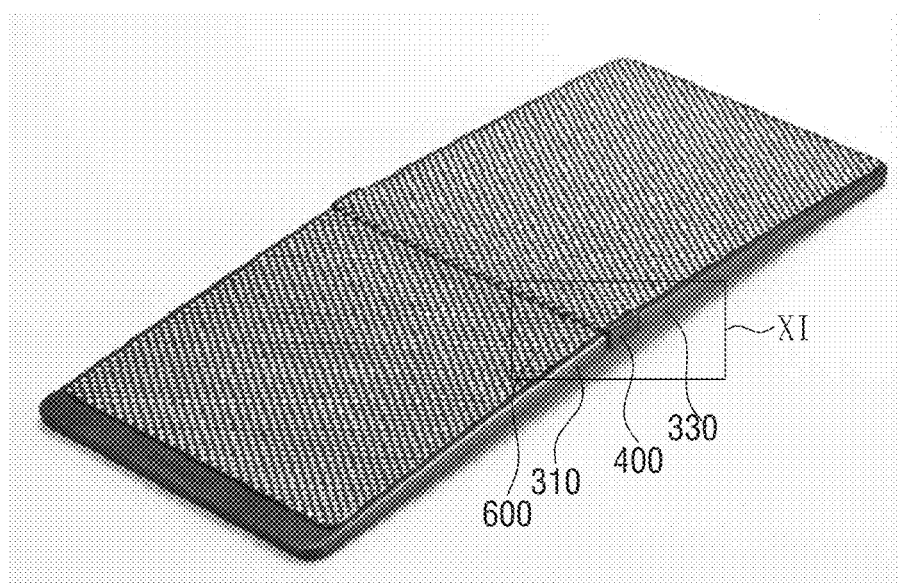
FIG. 11A is a perspective view illustrating an example in which a mesh type textile sheet is attached as a cover of a foldable display apparatus according to an embodiment of the present disclosure.
Figure 11B:
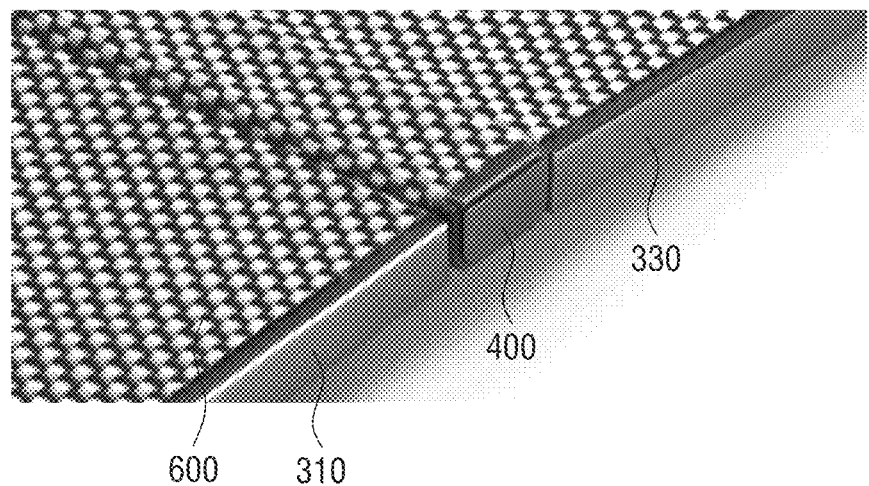
FIG. 11B is an enlarged view illustrating a portion XI indicated in FIG. 11A according to an embodiment of the present disclosure.

FIG. 11A is a perspective view illustrating an example in which a mesh type textile sheet is attached as a cover of a foldable display apparatus according to an embodiment of the present disclosure. FIG. 11B is an enlarged view illustrating a portion XI indicated in FIG. 11A according to an embodiment of the present disclosure.

Referring to FIG. 11A, the textile sheet may be made of various kinds of materials or textiles, but is it preferable to adopt a mesh type textile sheet which has superior durability and can be easily folded in a predetermined direction. Referring to FIG. 11B, it is preferable that the mesh type textile sheet is attached to the outer surfaces of the first body 210 and second body 230 and the outer surface of the hinge member 400 in consideration of the position at which the mesh type textile sheet can be easily folded.

Figure 10A:
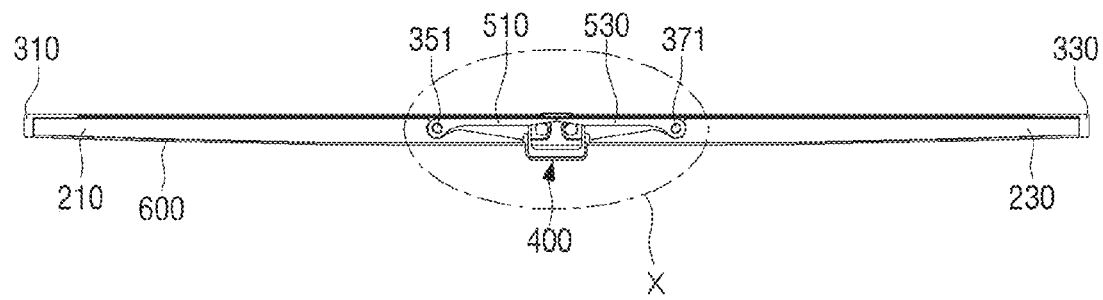
FIG. 10A is a cross-sectional view illustrating a foldable display apparatus in an unfolded state at a straight angle according to an embodiment of the present disclosure.
Figure 10B:
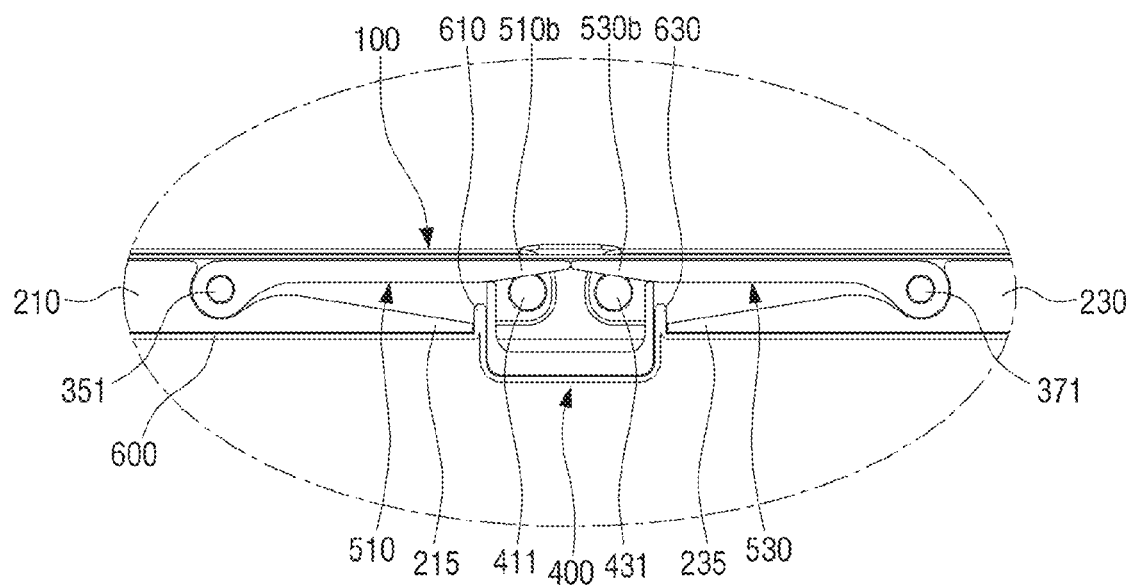
FIG. 10B is an enlarged view illustrating a portion X indicated in FIG. 10A according to an embodiment of the present disclosure.

FIG. 10A is a cross-sectional view illustrating a foldable display apparatus in an unfolded state at a straight angle according to an embodiment of the present disclosure. FIG. 10B is an enlarged view illustrating a portion X indicated in FIG. 10A according to an embodiment of the present disclosure.

Referring to FIGS. 10A and 10B, if the mesh type textile sheet is applied as the cover 600, a single wrinkle is naturally formed along the length direction of the hinge member 400 on the outer sides of the first portion 610 and the second portion 630 of the cover 600 as illustrated in FIG. 10B when the first body 610 and the second body 230 are unfolded to forma the straight angle. In this case, because the single wrinkle rather than a plurality of fine wrinkles is formed, the external appearance of the foldable display apparatus 10 becomes smart to improve the sense of beauty.

Further, during switching from the first position to the second position, the first portion 610 and the second portion 630 of the cover 600 are naturally folded and are completely drawn into first gap G1 and second gap G2 to be described later. Accordingly, the first gap G1 and the second gap G2 are buried by the first portion 610 and the second portion 630, and thus it becomes possible to prevent user's skin or nail from being caught in the first gap G1 and the second gap G2.

Hereinafter, referring to FIGS. 8A to 10B, the effect of the foldable display apparatus 10 according to an embodiment of the present disclosure will be described.

Figure 8A:
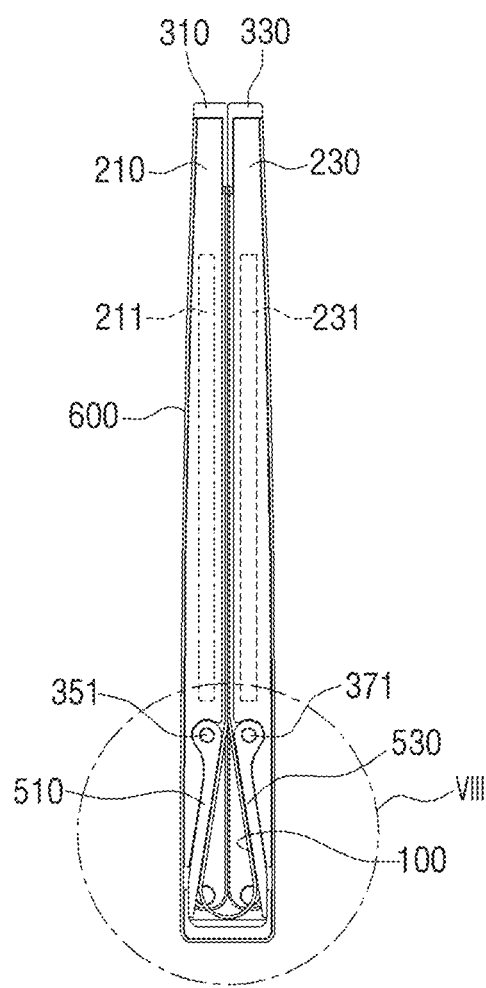
FIG. 8A is a cross-sectional view illustrating a foldable display apparatus in a folded state according to an embodiment of the present disclosure.
Figure 8B:
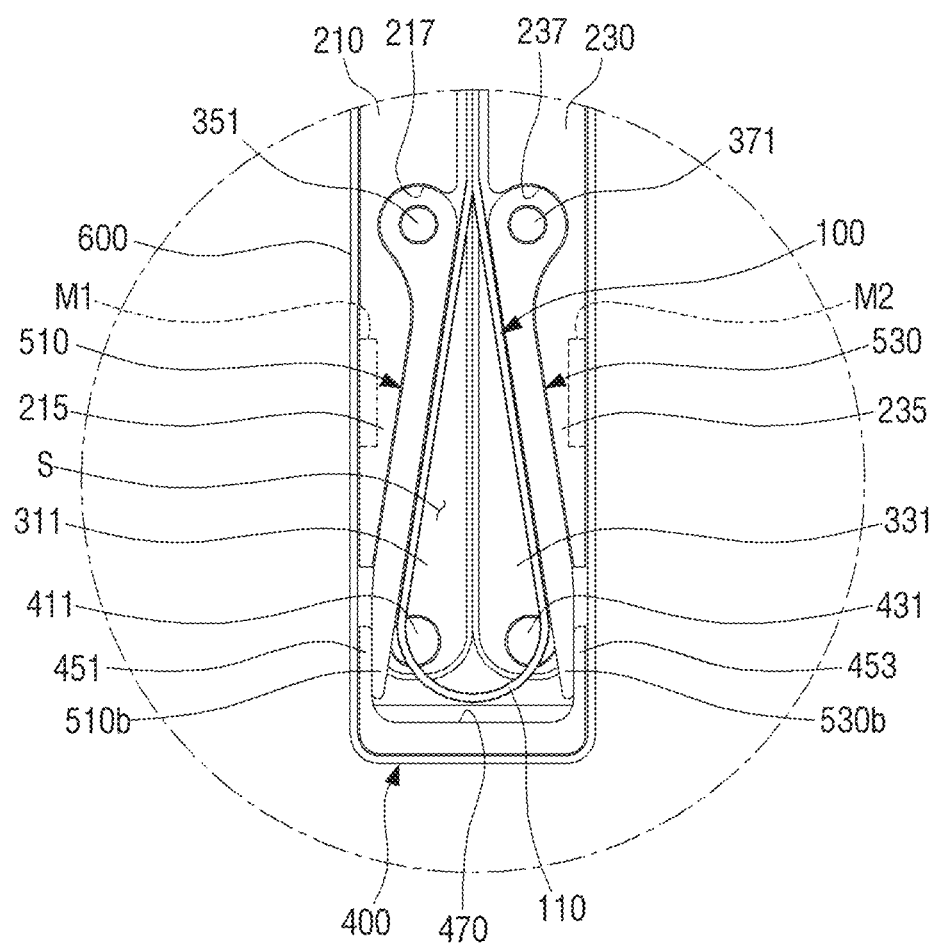
FIG. 8B is an enlarged view illustrating a portion VIII indicated in FIG. 8A according to an embodiment of the present disclosure.

FIG. 8A is a cross-sectional view illustrating a foldable display apparatus in a folded state according to an embodiment of the present disclosure. FIG. 8B is an enlarged view illustrating a portion VIII indicated in FIG. 8A according to an embodiment of the present disclosure.

Referring to FIGS. 8A and 8B, if the foldable display apparatus 10 is not in use, the first body 210 and the second body 230 are set to be at the first position at which the first body 210 and the second body 230 are folded toward each other according to an embodiment of the present disclosure.

At this time, the first support 510 and the second support 530 are pulled toward the adjacent portion 215 of the first body 210 and the adjacent portion 235 of the second body 230 by the plurality of magnets M1 and M2, and the space portion S is provided to accommodate the folded portion 110 on which the flexible display panel 100 is bent with the predetermined curvature.

In this case, the folded portion 110, which comes in non-contact with one portion of the flexible display panel 100 that is attached to the first support 510 and the second support 530, is not pressed in the folding direction by the first support 510 and the second support 530, but is naturally bent with the predetermined curvature. As described above, because the portion that is supported by the first support 510 and the second support 530 of the flexible display panel 100 is not compulsorily pressed by the first support 510 and the second support 530, fatigue load that is caused by the pressing force of the first support 510 and the second support 530 is not applied to the corresponding portion.

Figure 9A:
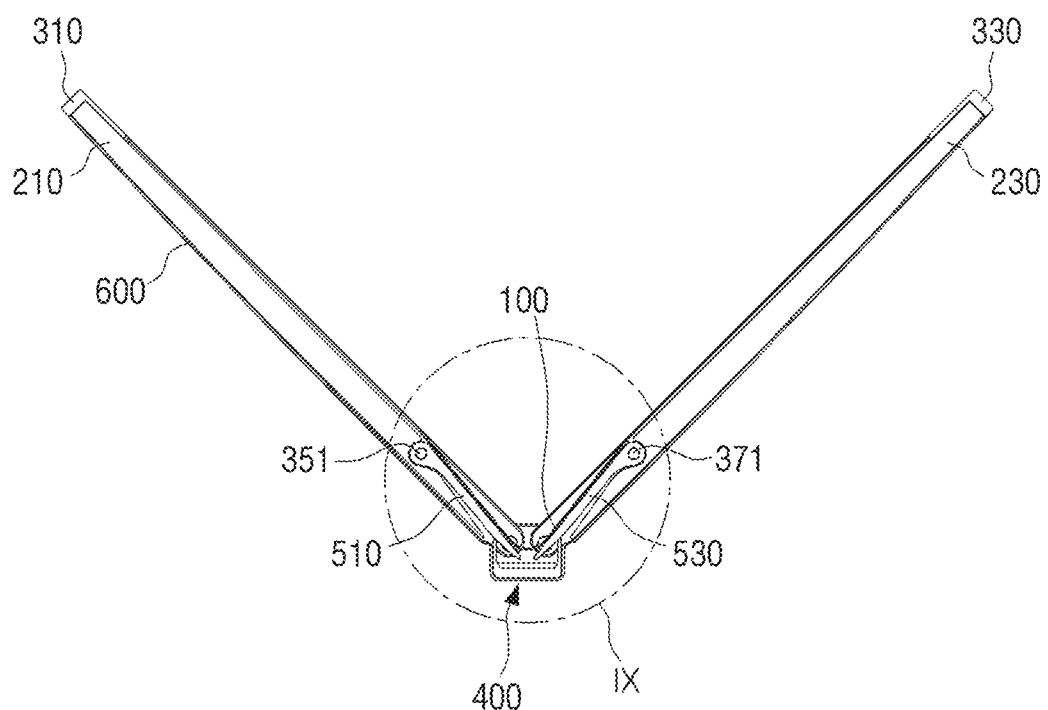
FIG. 9A is a cross-sectional view illustrating a foldable display apparatus in a half-unfolded state according to an embodiment of the present disclosure.
Figure 9B:
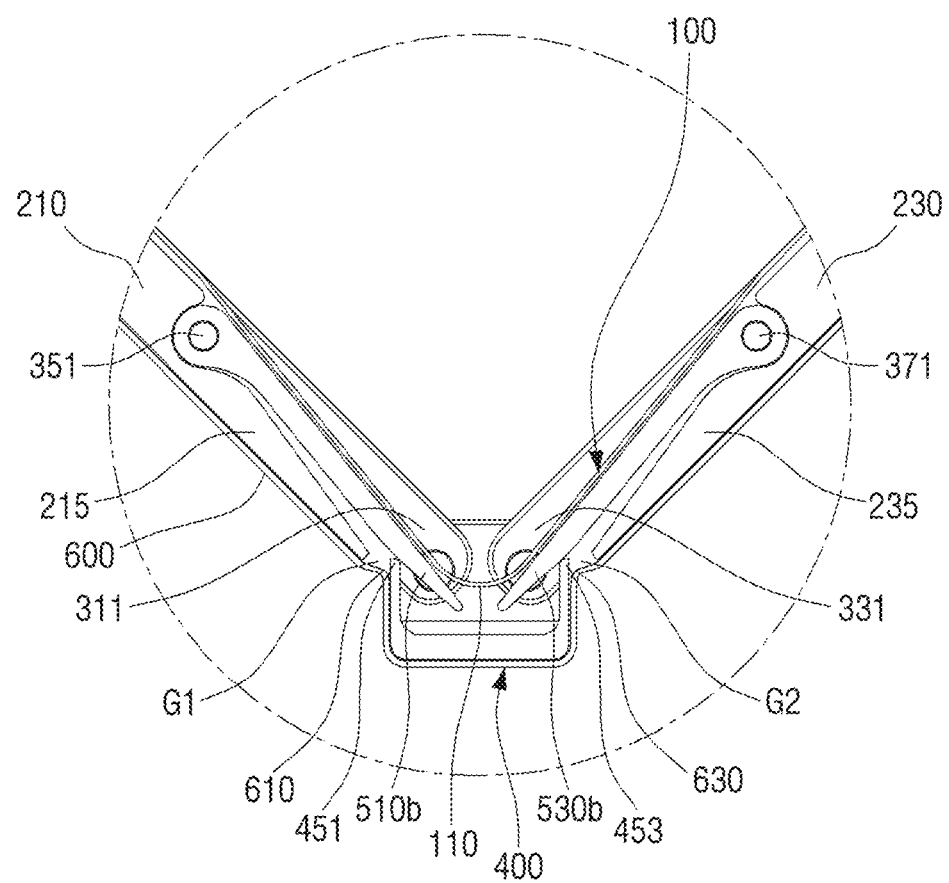
FIG. 9B is an enlarged view illustrating a portion IX indicated in FIG. 9A according to an embodiment of the present disclosure.

FIG. 9A is a cross-sectional view illustrating a foldable display apparatus in a half-unfolded state according to an embodiment of the present disclosure. FIG. 9B is an enlarged view illustrating a portion IX indicated in FIG. 9A according to an embodiment of the present disclosure.

Referring to FIGS. 9A and 9B, a movement procedure from the first position to the second position is illustrated.

The first support 510 and the second support 530 swing about the third hinge projection 351 and the fourth hinge projection 371 in a state in which the respective free end portion 510*b* and free end portion 530*b* are supported to come in contact with the first wall 451 and the second wall 453 of the hinge member 400. Accordingly, the first support 510 and the second support 530 become gradually apart from the adjacent portion 215 of the first body 210 and the adjacent portion 235 of the second body 230 over a large distance.

As illustrated in FIG. 9B, the cover 600 is folded as the first portion 610 of the cover 600 is drawn into a gap G1 that is formed between the adjacent portion 215 of the first body 210 and the first wall 451 of the hinge member 400. Further, the cover 600 is folded as the second portion 630 of the external cover 600 is drawn into a gap G2 that is formed between the adjacent portion 235 of the second body 230 and the second wall 453 of the hinge member 400.

In this case, if a mesh type textile sheet is applied to the cover 600, as illustrated in FIG. 9B, a single wrinkle is naturally formed along the length direction of the hinge member 400 on the outside of the first and second portions 610 and 630 of the cover 600. Because the formed wrinkle is not fine wrinkles, but is a single wrinkle, the external appearance of the foldable display apparatus 10 becomes smart to improve the sense of beauty.

FIGS. 10A and 10B show a state in which the first and second bodies 210 and 230 have been shifted to the second position at which the first and second bodies form a straight angle according to an embodiment of the present disclosure.

The first support 510 and the second support 530 are positioned on substantially the same plane as the plane of the first body 210 and the second body 230 in a state in which the first and second supports come in contact with the first wall 451 and the second wall 453.

Accordingly, the flexible display panel 100 is supported to keep good flatness by the first body 210 and the second body 230, and the first support 510 and the second support 530. In this case, the flexible display panel 100 is supported with respect to the whole area by the first body 210 and the second body 230 and the first support 510 and the second support 530.

Accordingly, when a user touches the flexible display panel 100 (in particular, the folded portion 110 of the flexible display panel 100), the foldable display apparatus 10 is not pushed from the touch point in the touch direction of the flexible display panel 100, and thus an accurate touch operation becomes possible. Accordingly, the usability of the foldable display apparatus 10 can be maximized.

In contrast, the cover 600, as illustrated in FIG. 10B, is completely drawn into the first gap G1 and the second gap G2 in a state in which the first portion 610 and the second portion 630 are folded to fill the first gap G1 and the second gap G2. Accordingly, while the user uses the foldable display apparatus 10, user's skin or nail can be prevented from being caught in the first gap G1 and the second gap G2.

While the present disclosure has been shown and described with reference to various embodiments thereof, it will be understood by those skilled in the art that various changes in form and details may be made therein without departing from the spirit and scope of the present disclosure, as defined by the appended claims and their equivalents.

What is claimed is:

1. A hinge device comprising:
a first body configured to support a first portion of a flexible display panel;
a second body configured to support a second portion of the flexible display panel;
a hinge member configured to hinge-connect the first body and the second body with each other in a foldable manner;
a first support, comprising an end portion of the first support pivotably attached to the first body and a free end portion of the first support; and
a second support, comprising an end portion of the second support pivotably attached to the second body and a free end portion of the second support,
wherein the first support and the second support respectively include sides respectively arranged on the first body and the second body to swing and configured to form with the hinge member an accommodation space into which a folded portion of the flexible display panel extends and is folded to form a curvature in a folded arrangement in which the first body and the second body are folded such that the first portion and the second portion are disposed face to face, and to support the folded portion of the flexible display panel in an unfolded arrangement in which the first body and the second body are unfolded such that the first portion, the second portion, and the folded portion are disposed supported in substantially a single plane.

2. The hinge device as claimed in claim 1, wherein the hinge member has a groove formed thereon, into which the respective free end portions of the first support and the second support are inserted at the first position.

3. The hinge device as claimed in claim 2, wherein the respective free end portions of the first support and the second support are supported at upper ends of both side walls of the groove.

4. The hinge device as claimed in claim 1, wherein the first body and the second body have inclined surfaces formed on an inside of a portion at which the first support and the second support overlap each other.

5. The hinge device as claimed in claim 1, wherein the first body and the second body and the first support and the second support are arranged on a same plane in the folded arrangement.

6. The hinge device as claimed in claim 1, wherein the flexible display panel has a non-attachment section that is not attached to the first support and the second support.

7. The hinge device as claimed in claim 1, wherein a non-attachment section of the flexible display panel that is not attached to the first support and the second support corresponds to the folded portion that forms the curvature of the flexible display panel when the first body and the second body are in the folded arrangement.

8. The hinge device as claimed in claim 1, wherein free end portions of the first support and the second support are pulled toward the hinge member and come in contact with the hinge member.

9. The hinge device as claimed in claim 8, wherein an attractive force that is caused by a magnetic force acts between the first support and the second support and the hinge member.

10. The hinge device as claimed in claim 8, wherein a first elastic member is arranged between the first support and the first body, and
wherein a second elastic member is arranged between the second support and the second body.

11. The hinge device as claimed in claim 10, wherein the first elastic member comprises a tensile spring having one end connected to the first support and the other end connected to the first body, and
wherein the second elastic member comprises a tensile spring having one end connected to the second support and the other end connected to the second body.

12. The hinge device as claimed in claim 8, wherein the first elastic member and the second elastic member comprise torsion springs.

13. The hinge device as claimed in claim 1, wherein the first body and the second body simultaneously swing at a same angle against the hinge member.

14. A foldable display apparatus comprising:
a flexible display panel;
a first body portion and a second body portion configured to support a rear surface of the flexible display panel;
a hinge member configured to connect the first body portion and the second body portion with each other in a foldable manner; and a first support and a second support configured to be arranged to overlap the first and second body portions in a separable manner, wherein the first support comprises an end portion of the first support pivotably attached to the first body and a free end portion of the first support and the second support comprises an end portion of the second support pivotably attached to the second body and a free end portion of the second support, and wherein the first support and the second support form with the hinge member an accommodation space into which a folded portion of the flexible display panel extends and is bent to have a curvature of the flexible display panel when the first body portion and the second body portion are in a folded arrangement such that a first portion of the flexible display panel and a second portion of the flexible display panel are disposed face to face, and support the rear surface of the flexible display panel in substantially a single plane when the first body portion and the second body portion form a straight angle.

15. The foldable display apparatus as claimed in claim 14, wherein when the first body portion and the second body portion form the straight angle, the first body portion and the second body portion and the first support and the second support are arranged on a same plane.

16. The foldable display apparatus as claimed in claim 14, wherein free end portions of the first support and the second support are pulled toward the hinge member and come in contact with the hinge member.

17. The foldable display apparatus as claimed in claim 14, wherein the first and second body portions comprise:
a first body and a second body attached to the flexible display panel with a gap; and
a first frame and a second frame configured to surround parts of outlines of the first body and the second body and hinge-connected to both sides of the hinge member,
wherein hinge connection portions between the first support and the first frame and between the second support and the second frame have gaps in which the first support and the second support can move.

18. The foldable display apparatus as claimed in claim 14, wherein the first body portion includes a first gear fixed to a portion that is hinge-connected to the hinge member, and
wherein the second body portion includes a second gear fixed to a portion that is hinge-connected to the hinge member and is tooth-engaged with the first gear.

19. The foldable display apparatus as claimed in claim 14, further comprising:
a cover that surrounds outer side surfaces of the hinge member, the first body portion, and the second body portion,
wherein in the folded arrangement the cover is folded into a gap formed between the first body portion and second body portion and the hinge member to form a wrinkle.

* * * * *